US010499202B1

(12) United States Patent
Koh et al.

(10) Patent No.: US 10,499,202 B1
(45) Date of Patent: Dec. 3, 2019

(54) CONTACT LIST FOR THE INTERNET OF THINGS

(71) Applicant: MOTOROLA SOLUTIONS, INC, Chicago, IL (US)

(72) Inventors: Ming Yeh Koh, Bdr Baru Air Itam (MY); Soon Hoe Lim, Ipoh (MY); Bing Qin Lim, Jelutong (MY); Syed Isa Syed Idrus, Bayan Lepas (MY)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 0 days.

(21) Appl. No.: 16/172,933

(22) Filed: Oct. 29, 2018

(51) Int. Cl.
| | |
|---|---|
| *G06F 3/0482* | (2013.01) |
| *H04L 29/08* | (2006.01) |
| *H04L 12/24* | (2006.01) |
| *H04W 4/10* | (2009.01) |
| *H04W 4/70* | (2018.01) |
| *H04W 76/45* | (2018.01) |
| *H04W 88/02* | (2009.01) |
| *H04W 84/08* | (2009.01) |
| *H04L 29/06* | (2006.01) |

(52) U.S. Cl.
CPC .............. *H04W 4/10* (2013.01); *H04W 4/70* (2018.02); *H04W 76/45* (2018.02); *H04W 88/023* (2013.01); *H04L 65/4061* (2013.01); *H04W 84/08* (2013.01)

(58) Field of Classification Search
CPC ........... H04W 4/08; H04W 4/10; H04W 4/02; H04W 4/023; H04W 4/16; H04W 4/70; H04W 8/186; G06F 17/278; G06F 17/2785; G06F 17/289; G06F 3/0482; H04L 41/22; H04L 65/4061; H04L 67/12
USPC ............. 455/41.1, 41.2, 519, 518, 412, 515; 707/736; 709/203, 204, 226, 230; 715/734
See application file for complete search history.

(56) References Cited

U.S. PATENT DOCUMENTS

| | | | | |
|---|---|---|---|---|
| 5,469,569 | A * | 11/1995 | Grube | .................... G06F 11/006 |
| 5,758,291 | A * | 5/1998 | Grube | .................... H04W 84/08 |
| | | | | 455/518 |
| 5,933,780 | A * | 8/1999 | Connor | .................. H04W 84/08 |
| | | | | 455/413 |
| 9,392,421 | B2 | 7/2016 | Subbaramoo et al. | |
| 9,584,987 | B1 * | 2/2017 | Bar-On | ................... H04W 4/10 |
| 9,871,754 | B2 * | 1/2018 | Modi | .................. H04L 49/1584 |
| 10,129,711 | B1 * | 11/2018 | Saadoun | ............. H04L 65/4061 |
| 10,341,824 | B1 * | 7/2019 | Tov | ......................... H04L 67/12 |
| 2005/0143135 | A1 * | 6/2005 | Brems | ................. H04M 1/2745 |
| | | | | 455/564 |
| 2005/0197146 | A1 * | 9/2005 | Rao | ........................ H04W 8/186 |
| | | | | 455/519 |
| 2006/0223518 | A1 * | 10/2006 | Haney | ...................... H04W 4/21 |
| | | | | 455/420 |
| 2007/0281722 | A1 * | 12/2007 | Gao | .................... H04W 72/005 |
| | | | | 455/518 |
| 2008/0003942 | A1 * | 1/2008 | Namm | .................... H04W 4/10 |
| | | | | 455/11.1 |
| 2008/0207241 | A1 * | 8/2008 | Namm | .................... H04W 4/08 |
| | | | | 455/518 |

(Continued)

*Primary Examiner* — Tan H Trinh
(74) *Attorney, Agent, or Firm* — Kenneth A. Haas

(57) ABSTRACT

An Internet of Things (IoT) device contact has a talkgroup/contact name modified based on an IoT location, a device location, and a heading from the device to the IoT location.

13 Claims, 14 Drawing Sheets

(56) References Cited

U.S. PATENT DOCUMENTS

| | | | | |
|---|---|---|---|---|
| 2008/0311945 | A1* | 12/2008 | Balo | H04W 72/005 455/518 |
| 2010/0082829 | A1* | 4/2010 | LoGalbo | H04W 4/08 709/230 |
| 2012/0122510 | A1* | 5/2012 | Mistro | H04W 72/121 455/519 |
| 2013/0244712 | A1* | 9/2013 | Kuzio | H04W 72/048 455/509 |
| 2014/0047487 | A1 | 2/2014 | Guedalia et al. | |
| 2014/0233447 | A1* | 8/2014 | Ofir | H04W 4/10 370/312 |
| 2014/0243034 | A1* | 8/2014 | Gurney | H04W 4/70 455/519 |
| 2014/0324973 | A1* | 10/2014 | Goel | H04W 4/70 709/204 |
| 2014/0344269 | A1* | 11/2014 | Dong | H04L 67/12 707/736 |
| 2014/0359131 | A1* | 12/2014 | Seed | H04W 4/70 709/226 |
| 2015/0147996 | A1* | 5/2015 | Hobby | H04W 4/90 455/404.1 |
| 2015/0256385 | A1* | 9/2015 | Chandhok | H04L 41/18 715/734 |
| 2016/0036764 | A1* | 2/2016 | Dong | H04L 61/3025 370/254 |
| 2016/0088049 | A1* | 3/2016 | Seed | H04W 4/70 709/203 |
| 2016/0173327 | A1* | 6/2016 | Boonie | H04W 12/06 370/254 |
| 2016/0182480 | A1* | 6/2016 | Entezari | H04L 63/08 726/4 |
| 2016/0227384 | A1* | 8/2016 | Mazzarella | H04W 4/08 |
| 2016/0234658 | A1* | 8/2016 | Tillet | H04W 4/08 |
| 2016/0241988 | A1* | 8/2016 | Slevin | H04W 4/70 |
| 2016/0366123 | A1* | 12/2016 | Smith | H04L 61/1511 |
| 2017/0063566 | A1* | 3/2017 | Seminario | H04L 12/2816 |
| 2017/0099455 | A1* | 4/2017 | Mazzarella | H04W 4/90 |
| 2017/0223807 | A1 | 8/2017 | Recker et al. | |
| 2017/0345420 | A1 | 11/2017 | Barnett, Jr. | |
| 2017/0351504 | A1* | 12/2017 | Riedl | H04L 67/34 |
| 2017/0359417 | A1* | 12/2017 | Chen | H04L 67/12 |
| 2018/0117446 | A1* | 5/2018 | Tran | A61B 5/0022 |
| 2018/0152391 | A1* | 5/2018 | Huh | H04L 67/303 |
| 2018/0176727 | A1* | 6/2018 | Williams | A61B 5/6802 |
| 2018/0203926 | A1* | 7/2018 | Phan | G06Q 30/02 |
| 2018/0264347 | A1* | 9/2018 | Tran | G16H 50/20 |
| 2018/0302948 | A1* | 10/2018 | Kotlyarov | G06F 3/0488 |
| 2018/0338241 | A1* | 11/2018 | Li | H04L 12/2809 |
| 2018/0359811 | A1* | 12/2018 | Verzun | H04L 12/28 |
| 2018/0364654 | A1* | 12/2018 | Locke | G05B 13/0265 |
| 2018/0376417 | A1* | 12/2018 | Wang | H04W 52/0216 |
| 2019/0044826 | A1* | 2/2019 | Flores Guerra | H04L 41/22 |
| 2019/0053117 | A1* | 2/2019 | Bae | H04W 36/165 |
| 2019/0098723 | A1* | 3/2019 | Sadwick | H05B 33/0866 |
| 2019/0116087 | A1* | 4/2019 | Hiller | H04L 67/12 |
| 2019/0121497 | A1* | 4/2019 | Tov | H04L 41/22 |
| 2019/0230063 | A1* | 7/2019 | McCready | H04L 63/00 |

\* cited by examiner

CONTACT LIST FOR THE INTERNET OF THINGS

BACKGROUND OF THE INVENTION

The Internet of Things (IoT) refers to the connection of every-day devices to the Internet. Devices such as cars, kitchen appliances, medical devices, doors, windows, HVAC systems, drones, . . . , etc. can all be connected through the IoT. Basically, anything that can be powered can be connected to the internet to control its functionality. The IoT allows objects to be sensed or controlled remotely across existing network infrastructure, creating opportunities for more direct integration of the physical world into computer-based systems, and resulting in improved efficiency, accuracy, and control.

Push-to-talk (PTT) devices are commonly employed by public safety personnel, air traffic controllers, emergency workers, construction site workers and others who need to be in constant and readily available voice communication. PTT, also known as press-to-transmit, is a method of communicating using half-duplex communication lines. A PTT button may be pressed to switch a device from a voice reception mode to a transmit-mode. For example, one operator may depress the PTT button on her device and speak into the device's microphone. The speech is converted into an appropriate format and transmitted to one or more other devices, where the operators of those other devices hear the first operator speak through their device's speaker.

In a two-way radio system, each PTT radio typically communicates with one group of radios (talkgroup) at a time. Even though a radio may switch between talkgroups, the radio may still only be able to communicate with a single talkgroup at a time. For example, a firefighter may be affiliated with or using a firefighter talkgroup and a police officer may be affiliated with or using a police talkgroup. Talkgroups outside of those currently listened to by a radio will not be heard by other radios or consoles. Thus, a radio speaker will only output audio from a talkgroup associated with the radio, and the radio's transmission will only be heard by those communicating on a same talkgroup.

Instead of assigning, for example, a radio channel to one particular organization (group) at a time, users are instead assigned to a logical grouping, a "talkgroup". When any user in that group wishes to converse with another user in the talkgroup, a vacant radio channel is found automatically by the system and the conversation takes place on that channel. Many unrelated conversations can occur on a channel, making use of the otherwise idle time between conversations. A control channel coordinates all the activity of the radios in the system. The control channel sends packets of data to enable one talkgroup to talk together, regardless of frequency.

Because PTT and talkgroups are so ubiquitous in the public-safety realm, it would be beneficial if PTT and talkgroups could be used to control devices for the IoT, therefore a need exists PTT for the IoT.

BRIEF DESCRIPTION OF THE SEVERAL VIEWS OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present invention.

Figure 1:
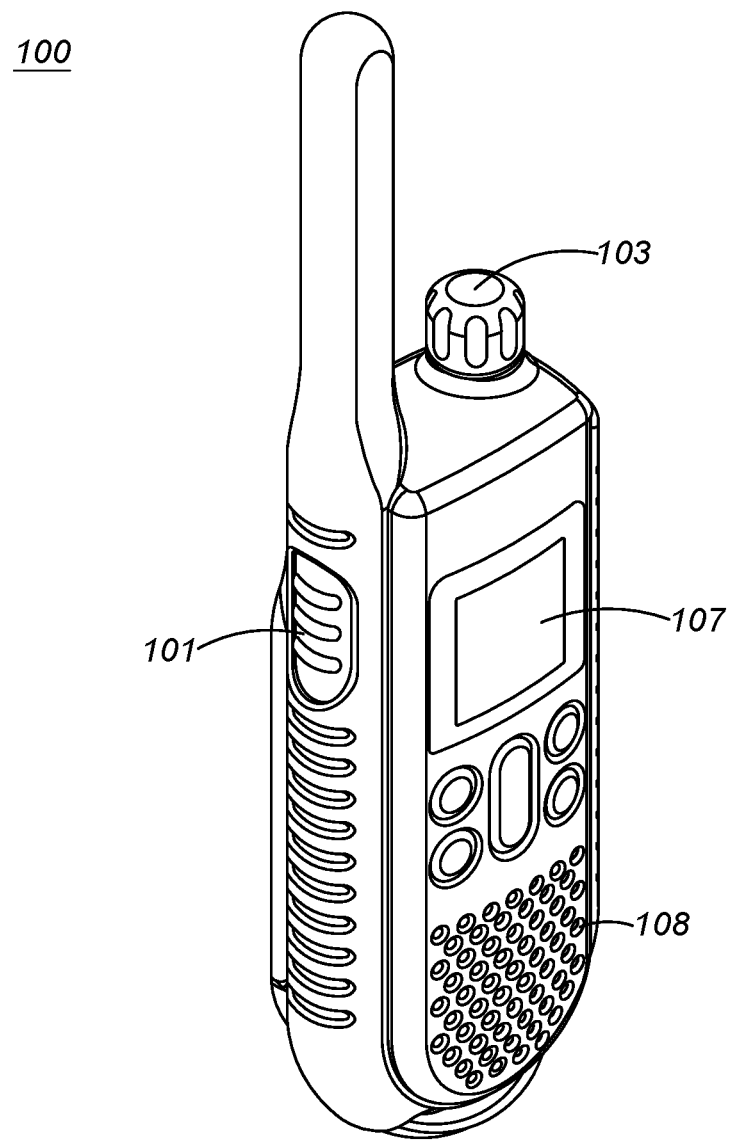
FIG. 1 illustrates push-to-talk (PTT) radio.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. It will further be appreciated that certain actions and/or steps may be described or depicted in a particular order of occurrence while those skilled in the art will understand that such specificity with respect to sequence is not actually required.

DETAILED DESCRIPTION

In order to address the above-mentioned need, a method and apparatus for PTT over IoT is described herein. During operation each IoT device will be assigned to a talkgroup. Some talkgroups may have a single IoT device assigned, and other talkgroups may have multiple IoT devices assigned. During operation, an action command is received over a first talkgroup and a first command type is issued to a first IoT device assigned to that talkgroup. A second action command is received over a second talkgroup and a second command type is issued to a second IoT device assigned to the second talkgroup.

It should be noted that the "action command" may simply be any transmission received over a particular talkgroup, even a simple keying of a microphone, with no other voice or data transmission (i.e., the received "action command" comprises an un-modulated carrier signal with no data or voice). In other words, sinusoidal signal that is used in the modulation is known as the carrier signal, or simply "the carrier". The signal that is used in modulating the carrier signal (or sinusoidal signal) is known as the "data signal" or the "message signal". It is important to notice that a simple sinusoidal carrier contains no information of its own, and may be used to control IoT devices as described.

However, in alternate embodiments, an "action command" may comprise information modulated on the carrier signal, for example, the utterance of specific words, for example, "unlock the door", "turn on the lights", . . . , etc.

So for example, in a first embodiment, a radio tuned to a "door" talkgroup may unlock the door by simply tuning their radio to the "door talkgroup" and keying their microphone by pushing the PTT button on their radio. In a second embodiment, a radio tuned to a "door" talkgroup may unlock the door by simply tuning their radio to the "door talkgroup" and keying their microphone by pushing the PTT button on their radio, and uttering "unlock" into their radio.

As an example, consider a public-safety officer that is approaching a room with a locked door. The public-safety officer can initiate a PTT call to the talkgroup that include all actuators for the door and the door of the room can be opened. If a light for the room is in the same talkgroup, then the light can be switched on with the same PTT call.

Because there may be thousands of IoT devices that are accessible by the above technique, an IoT device contact section of a user address book will be created for devices accessing IoT devices. IoT devices will appear in the various sections of a user's contact list. For example, recently-accessed IoT devices may appear in the "recently called" section of the user's contacts, favorite IoT devices may appear in a "favorites" section of the user's contacts, and/or nearby IoT devices may appear in a "nearby IoT devices" section of the user's contacts.

In addition to the above sections of the user's contacts, a "relevant IoT devices" section may be included in the user's contacts as well. IoT devices will appear in this section when they are ranked above a predetermined threshold. For example, a relevancy ranking may comprise things that are relevant to a current work tasks, etc. For example, a relevancy ranking may comprise things that are relevant to a current work tasks, etc. For example, a field technician fixing a remote pump will cause the pump to have high relevancy. Also a relevancy ranking may comprise things in alarms state that are relevant to the user and associated with an action that can stop the alarm. For example a car may have high relevancy when the fuel level is low.

FIG. 1 illustrates push-to-talk (PTT) radio 100. As shown, radio 100 comprises PTT button 101, knob 103, display/screen 107, and speaker/microphone 108. PTT button 101 comprises a standard button, that when pressed, transitions radio 100 from a listening state, to a transmit state, transmitting over a specific talkgroup. Display 107 comprises a way of conveying (e.g., displaying) PTT information to the user. In particular, in an embodiment, a talkgroup may be displayed to the user as an alpha-numeric output on display 107. Display 107 may simply comprise a liquid-crystal display (LCD), or may comprise additional types of displays (e.g., a light-emitting diode (LED) display). Display 107 may also comprise a touch-screen display that provides both an output interface and an input interface between the device and a user. Display 107 may also provide graphics, video, and any combination thereof.

Speaker/microphone combination 108 comprises a standard speaker for outputting audio and a standard microphone for receiving audio (voice). More particularly, speaker 108 converts an electrical signal generated from an active application to human-audible sound waves and microphone 108 converts sound waves to electrical signals for transmission.

Knob 103 serves as a way to control the volume of speaker 108, and also serves as a means for switching between talkgroups. Knob 103 is approximately a cylindrical object. Knob 103 can alternatively be implemented as a variety of different objects, including conical shapes, spherical shapes, dials, cubical shapes, rods, etc., and may have a variety of different textures on their surfaces, including bumps, lines, or other grips, or projections or members extending from the circumferential surface.

The user 201 (shown in FIG. 2) preferably grips or contacts the circumferential surface of knob 103 and rotates it a desired amount to scroll through menu items, for example, talkgroups that may be selected. Once knob 103 is rotated to highlight a particular talkgroup, any activation (pushing) of the PTT button 101 will cause radio 100 to communicate over the highlighted talkgroup.

Figure 2:
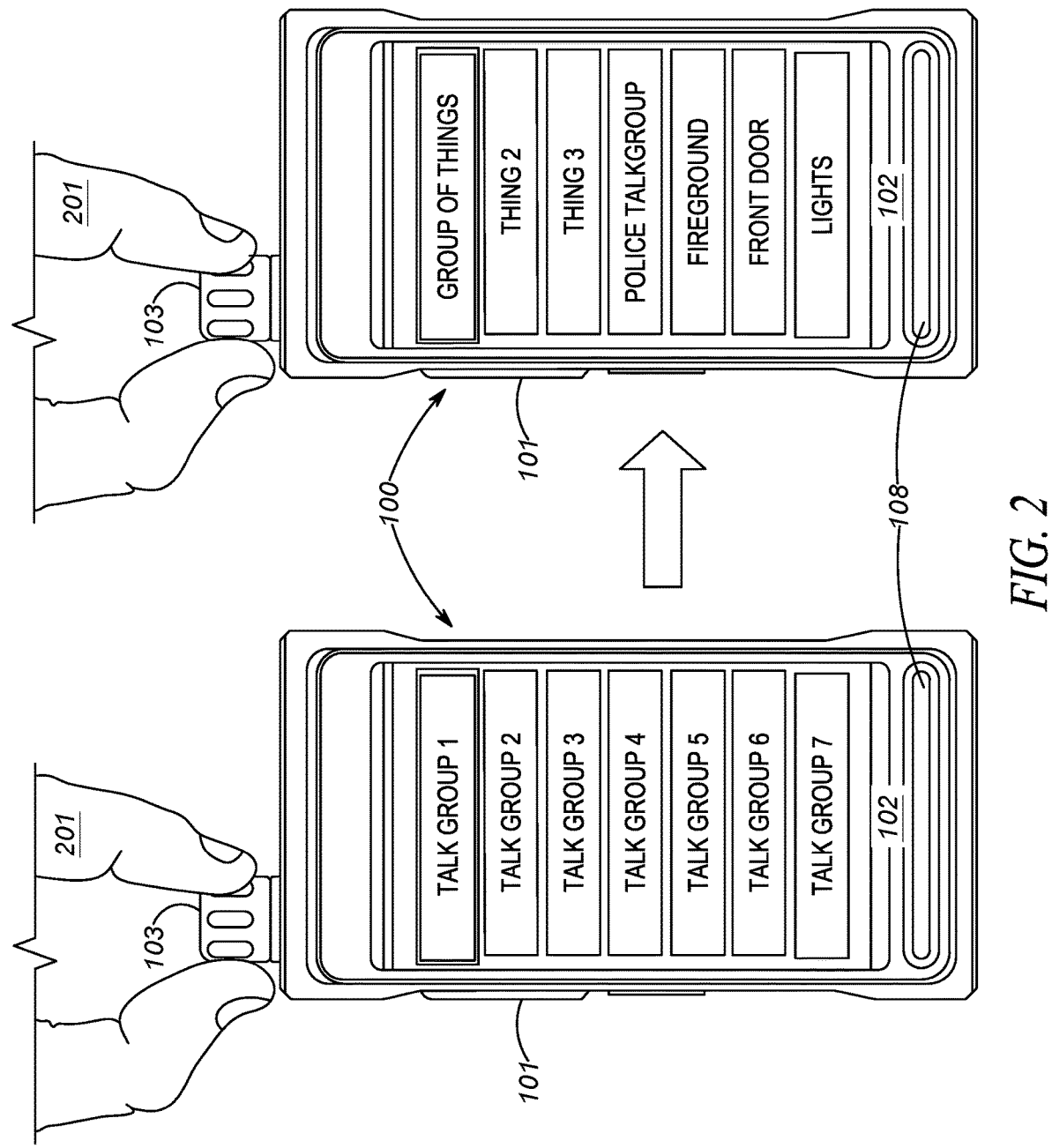
FIG. 2 illustrates push-to-talk (PTT) radio.

It should be noted that display 102 may display the names of the talkgroups, which include the names of IoT devices that are controlled by pushing the PTT button. For example, as shown in FIG. 2, the Police Talkgroup and the Fire ground talkgroup may be displayed, so when highlighted, communications to other police officers, or firemen take place upon the pushing of the PTT button 101. However, as shown, IoT devices may also be displayed, such as Front Door, Lights, Group of Things, Thing 2, Thing 3, . . . , etc. When an IoT device is highlighted, activation of the PTT button will cause the IoT device (or the group of devices) to function.

In order to accomplish the above, a PTT-to-Things Server is provided that is a member of all IoT talkgroups. Communication to the PTT-to-Things server over a particular talkgroup causes the PTT-to-Things server to map the talkgroup to a particular IoT device (or group of IoT devices), and potentially to a particular protocol to control an IoT device. The PTT-to-Things server then instructs the particular IoT device to perform an action.

As is known in the art, modern two-way radio systems comprise talkgroups, where it is possible for a radio to be a member of any combination of talkgroups. As a member of a talkgroup, a radio may receive transmissions from, as well as transmit to all members of the talkgroup. Transmission and reception of information to radios outside of an assigned talkgroup is generally not performed. Illustratively, a radio assigned to an ambulance may be a member of a Fire & Rescue talkgroup as well as a Law Enforcement talkgroup. Therefore, the radio may communicate with all members of the Fire & Rescue talkgroup as well as the Law Enforcement talkgroup. In the present invention, server 301 is provided that is a member of all talkgroups that are assigned to a "thing" connected to the IoT. This is illustrated in FIG. 3.

Figure 3:
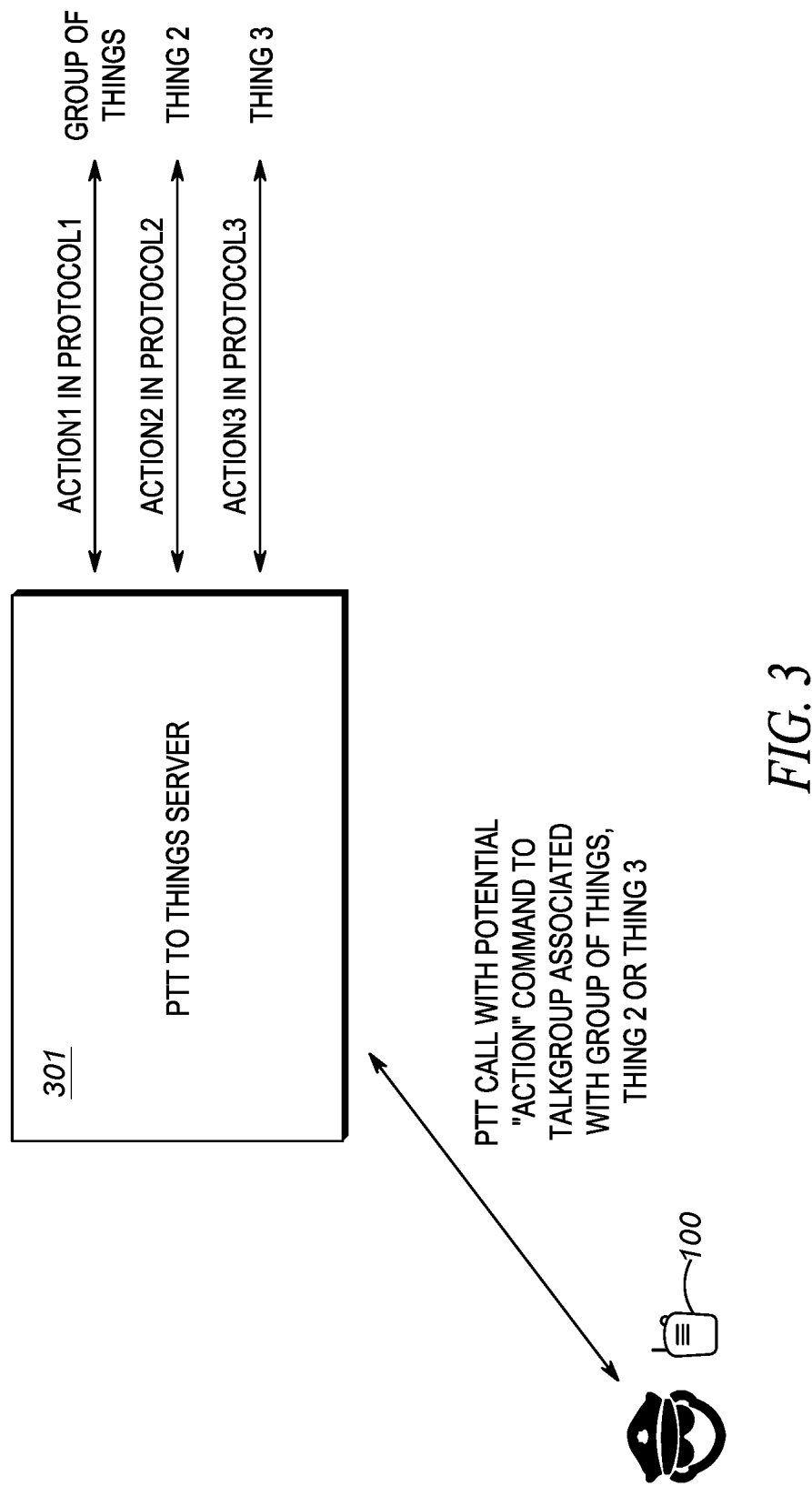
FIG. 3 illustrates a PTT to IoT server.

As shown in FIG. 3, PTT-to-Things server 301 is shown in communication with radio 100. PTT-to-Things server 301 is a member of a plurality of talkgroups. When PTT-to-Things server 301 receives a PTT call over a particular talkgroup, PTT-to-Things server 301 will map the particular talkgroup to a IoT device, and potentially a particular IoT protocol. PTT-to-Things server 301 will then communicate with the IoT device to cause the IoT device to perform a particular action.

As is known in the art, a particular communication protocol (IoT protocol) may be used for each IoT device. For example, various proprietary protocols such as DNP, Various IEC**** protocols (IEC 61850 etc. . . . ), bacnet, EtherCat, CANOpen, Modbus/Modbus TCP, EtherNet/IP, PROFIBUS, PROFINET, DeviceNet, . . . , etc. can be used. Also a more generic protocol such as Coap, Mqtt, and RESTfull may also be used.

As mentioned above, an action command may be received by PTT-to-Things server 301 as part of the PTT call over the particular talkgroup. PTT-to-Things server 301 may analyze the action command (which in a preferred embodiment comprises a voice command) and additionally map the action command to an instruction given to the IoT device.

In a further embodiment, a first instruction may be provided to the IoT device upon detecting transmission upon the particular talkgroup, and a second instruction may be provided to the IoT device upon detecting that no further transmission is being received on the talkgroup. (It should be noted that "transmission" comprises simply opening up the channel (transmitting the carrier signal) by pushing the PTT button, no voice needs to be detected). As an example, a user may switch their radio to a talkgroup associated with lighting in a room. Pushing and holding the PTT button may cause the lights to go on, while un-pressing the PTT button may cause the lights to go off. This entails PTT-to-Things server 301 to send an instruction to the lights to turn on upon detecting any transmissions on a particular talkgroup (even the carrier), and then instructing the lights to go off upon detecting that transmissions on a particular talkgroup has ceased.

Figure 4:
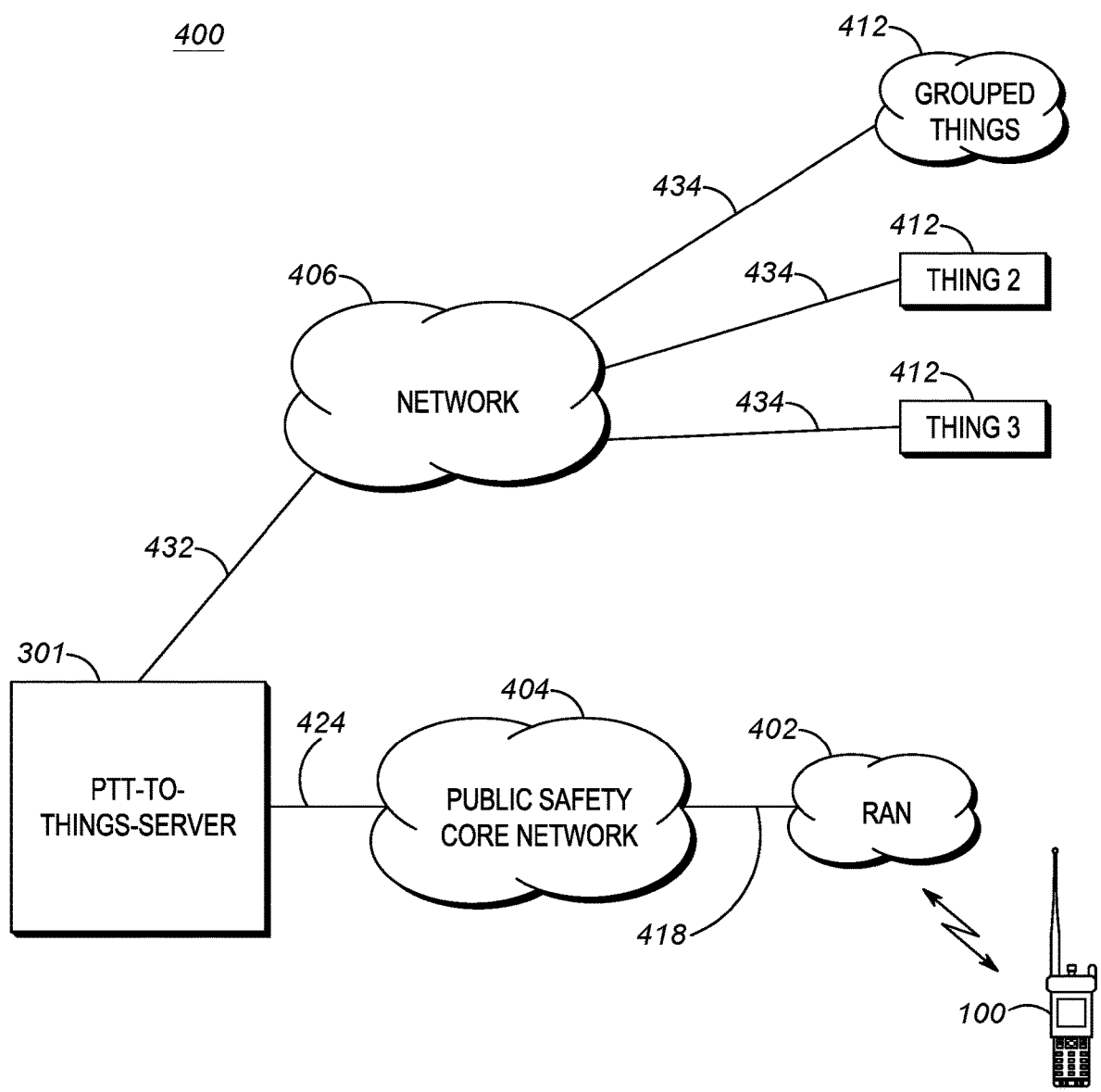
FIG. 4 depicts an example communication system that incorporates a PTT-to-Things server.

FIG. 4 depicts an example communication system 400 that incorporates PTT-to-Things server 301. It should be noted that the communication system depicted in FIG. 4 comprises a typical public-safety communication system modified with a PTT-to-Things server. However one of ordinary skill in the art would recognize that other system may be modified to encompass PTT-to-Things server 301 such as, but not limited to a cellular communication system, a cloud-based communication system, . . . , etc. System 400 includes one or more radio access networks (RANs) 402, a public-safety core network 404, PTT radio 100, IoT devices 412, PTT-to-Things server 301, and communication links 418, 424, and 432.

RAN 402 includes typical RAN elements such as base stations, base station controllers (BSCs), routers, switches, and the like, arranged, connected, and programmed to provide wireless service to user equipment (e.g., radio 100, and the like) in a manner known to those of skill in the relevant art. RAN 402 may implement a direct-mode, conventional, or trunked land mobile radio (LMR) standard or protocol such as European Telecommunications Standards Institute (ETSI) Digital Mobile Radio (DMR), a Project 25 (P25) standard defined by the Association of Public Safety Communications Officials International (APCO), Terrestrial Trunked Radio (TETRA), or other LMR radio protocols or standards. In other embodiments, RAN 402 may implement a Long Term Evolution (LTE), LTE-Advance, or 5G protocol including multimedia broadcast multicast services (MBMS) or single site point-to-multipoint (SC-PTM) over which an open mobile alliance (OMA) push to talk (PTT) over cellular (OMA-PoC), a voice over IP (VoIP), an LTE Direct or LTE Device to Device, or a PTT over IP (PoIP) application may be implemented. In still further embodiments, RAN 402 may implement a Wi-Fi protocol perhaps in accordance with an IEEE 802.11 standard (e.g., 802.11a, 802.11b, 802.11g) or a WiMAX protocol perhaps operating in accordance with an IEEE 802.16 standard.

Public-safety core network 404 may include one or more packet-switched networks and/or one or more circuit-switched networks, and in general provides one or more public-safety agencies with any necessary computing and communication needs, transmitting any necessary public-safety-related data and communications.

For narrowband LMR wireless systems, core network 404 operates in either a conventional or trunked configuration. In either configuration, a plurality of communication devices is partitioned into separate groups (talkgroups) of communication devices. In a conventional narrowband system, each communication device in a group is selected to a particular radio channel (frequency or frequency & time slot) for communications associated with that communication device's group. Thus, each group is served by one channel, and multiple groups may share the same single frequency (in which case, in some embodiments, group IDs may be present in the group data to distinguish between groups using the same shared frequency).

In contrast, a trunked radio system and its communication devices use a pool of traffic channels for virtually an unlimited number of groups of communication devices (e.g., talkgroups). Thus, all groups are served by all channels. The trunked radio system works to take advantage of the probability that not all groups need a traffic channel for communication at the same time.

Group calls may be made between wireless and/or wireline participants in accordance with either a narrowband or a broadband protocol or standard. Group members for group calls may be statically or dynamically defined. That is, in a first example, a user or administrator may indicate to the switching and/or radio network (perhaps at a call controller, PTT server, zone controller, or mobile management entity (MME), base station controller (BSC), mobile switching center (MSC), site controller, Push-to-Talk controller, or other network device) a list of participants of a group at the time of the call or in advance of the call. The group members (e.g., communication devices) could be provisioned in the network by the user or an agent, and then provided some form of group identity or identifier, for example. Then, at a future time, an originating user in a group may cause some signaling to be transmitted indicating that he or she wishes to establish a communication session (e.g., join a group call having a particular talkgroup ID) with each of the pre-designated participants in the defined group. In another example, communication devices may dynamically affiliate with a group (and also disassociate with the group) perhaps based on user input, and the switching and/or radio network may track group membership and route new group calls according to the current group membership.

Radio 100 may be any suitable computing and communication device configured to engage in wireless communication with the RAN 402, and ultimately to PTT-to-Things server 301 over the air interface as is known to those in the relevant art. It should also be noted that any one or more of the communication links 418, 424, 432, and 434 could include one or more wireless-communication links and/or one or more wired-communication links.

Expanding on the above, each user of the system may possess a radio to communicate over many differing talk-groups. Communication on various talkgroups will be routed by RAN 402 and network 404 to PTT-to-Things server 301. When PTT-to-Things server 301 receives a communication over a particular talkgroup from any radio 100, PTT-to-Things server 301 will map the particular talkgroup to a IoT device 412. Communication to a particular IoT device 412 (or group of devices if multiple IoT devices 412 are associated with the same talkgroup) will take place via communication links 432/434 and intervening network 406.

Network 406 preferably comprises one of many networks used to transmit data, such as but not limited to a network employing one of the following protocols: a Long Term Evolution (LTE) protocol, LTE-Advance protocol, or 5G protocol including multimedia broadcast multicast services (MBMS) or single site point-to-multipoint (SC-PTM) protocol over which an open mobile alliance (OMA) push to talk (PTT) over cellular protocol (OMA-PoC), a voice over IP (VoIP) protocol, an LTE Direct or LTE Device to Device protocol, or a PTT over IP (PoIP) protocol, a Wi-Fi protocol perhaps in accordance with an IEEE 802.11 standard (e.g., 802.11a, 802.11b, 802.11g) or a WiMAX protocol perhaps operating in accordance with an IEEE 802.16 standard.

With the above in mind, PTT-to-Things server 301 may also configured with a natural language processing (NLP) engine (not shown in FIG. 4) configured to determine an "action command" from any over-the-air voice transmissions received by radio 100. The NLP engine may also analyze oral queries and/or statements received by any user and provide responses to the oral queries and/or take other actions in response to the oral statements. It should be noted that any over-the-air communication between users (e.g., on the talkgroup) will be monitored by the NLP engine in order to determine the content of the over-the-air voice transmission.

Figure 5:
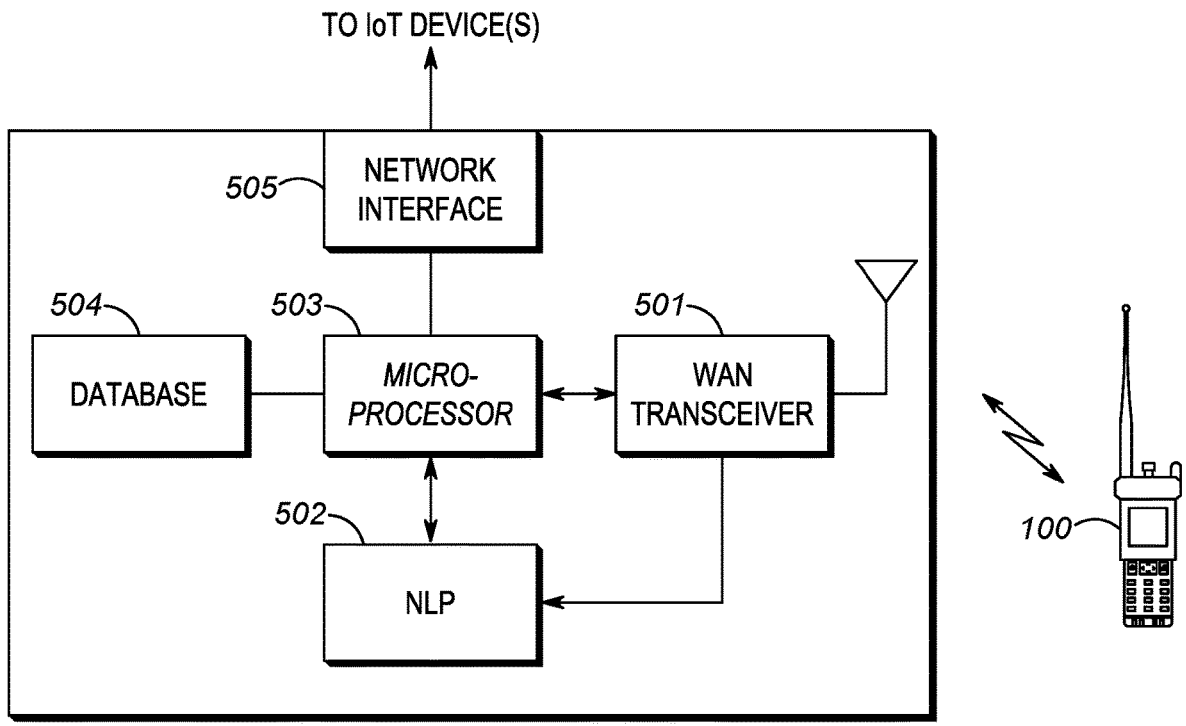
FIG. 5 is a block diagram of a PTT to IoT server.

FIG. 5 is a block diagram PTT to IoT server 301. In an embodiment, PTT to IoT server 301 is embodied within a dispatch center, however in alternate embodiments the device may be embodied within the public-safety core network 404, or more computing devices in a cloud compute cluster (not shown), or some other communication device not illustrated in FIG. 4, and/or may be a distributed communication device across two or more entities.

FIG. 5 shows those components (not all necessary) for PTT to IoT server 301 to receive a communication from a radio using a particular talkgroup, map the particular talkgroup to an IoT device(s), and send an appropriate command to the IoT device. For ease of illustration some components have been left out of FIG. 4. For example, a graphical user interface that provides the dispatch operator necessary information about public-safety officers is not shown since that component is not necessary for understanding the following discussion.

As shown, PTT to IoT server 301 may include a wide-area-network (WAN) transceiver 501 (e.g., a transceiver that utilizes a public-safety communication-system protocol), Natural Language Processor (NLP) 502, logic circuitry 503, database 504, and network interface 505. In other implementations, PTT to IoT server 301 may include more, fewer, or different components. Regardless, all components are connected via common data busses as known in the art.

WAN transceiver 501 may comprise well known long-range transceivers that utilize any number of network system protocols. (As one of ordinary skill in the art will recognize, a transceiver comprises both a transmitter and a receiver for transmitting and receiving data). For example, WAN transceiver 501 may be configured to utilize a next-generation cellular communications protocol operated by a cellular service provider, or any public-safety protocol such as an APCO 25 network or the FirstNet broadband network. WAN transceiver 501 receives communications from users over a particular talkgroup. It should be noted that WAN transceiver 501 is shown as part of PTT to IoT server 301, however, WAN transceiver 501 may be located in RAN 402 (e.g., a base station of RAN 202), with a direct link to PTT to IoT server 301.

NLP 502 may be a well known circuitry to analyze, understand, and derive meaning from human language in a smart and useful way. By utilizing NLP, automatic summarization, translation, named entity recognition, relationship extraction, sentiment analysis, speech recognition, and topic segmentation can take place.

Logic circuitry 503 comprises a digital signal processor (DSP), general purpose microprocessor, a programmable logic device, or application specific integrated circuit (ASIC) and is configured to map a talkgroup to an IoT device(s), and alternatively also map a talkgroup and potentially a received utterance to a command given to an IoT device. For example, consider a public-safety officer that is approaching a room with a locked door. The public-safety officer can initiate a PTT call using a particular talkgroup. WAN transceiver may detect the transmission and provide the transmission to logic circuitry 503. Logic circuitry 503 can (via mapping) determine that the talkgroup is associated with the locked door. Logic circuitry 503 then can instruct all actuators for the door to be opened.

The mapping process preferably comprises an operation that associates each element of a given set (the domain) with one or more elements of a second set (the range). The talkgroup and potentially an action command comprises the domain, while the IoT device and command the range. The mapping is preferably explicit based on predefined rules (e.g., talkgroup 423 is assigned to door lock 1).

Database 504 is provided. Database 504 comprises standard memory (such as RAM, ROM, . . . , etc) and serves to store talkgroup/IoT device pairs, and may additionally store talkgroup/IoT device pairs along with action command/action taken pairs. This is illustrated in Tables 1 and 2 below:

TABLE 1

Mapping of talkgroup to device and instruction when no verbal action command is used

| Talkgroup | Device | Instruction (control command) | Address of IoT device |
|---|---|---|---|
| 4320 | Lock at the Police Station | Switch from lock to unlock, or vice versa | 10.66.123 |
| 4356 | Light at the Police Station | Switch light from off to on or vice versa | 10.66.124 |
| 6748 | Air conditioning at the Police Station | Turn air conditioning from off to on or vice versa | 10.66.125 |
| . . . | . . . | . . . | . . . |

TABLE 2

Mapping of talkgroup to device and instruction when action command is used

| Talk group | Device | Verbal Action Command | Instruction (control command) | Address of IoT device |
|---|---|---|---|---|
| 4320 | Lock at the Police Station | unlock | Switch from lock to unlock | 10.66.124 |
| 4320 | Lock at the Police Station | lock | Switch from unlock to lock | 10.66.124 |
| 4356 | Light at the Police Station | off | Turn light off | 10.66.125 |
| 4356 | Light at the Police Station | on | Turn light on | 10.66.125 |
| . . . | . . . | . . . | . . . | . . . |

Finally, network interface 505 provides processing, modulating, and transceiver elements that are operable in accordance with any one or more standard or proprietary wireless interfaces, wherein some of the functionality of the processing, modulating, and transceiver elements may be performed by means of the logic circuitry 503 through programmed logic such as software. Examples of network interfaces (wired or wireless) include Ethernet, T1, USB interfaces, IEEE 802.11b, IEEE 802.11g, etc.

FIG. 5 illustrates an apparatus comprising logic circuitry receiving a talkgroup identification and mapping the talkgroup identification to an Internet-of-Things (IoT) device, the logic circuitry also determining a control command based on the IoT device. A network interface is provided that is coupled to the logic circuitry, the network interface outputs the control command to operate the IoT device.

As discussed the logic circuitry may also receive a verbal action command and determines the control command based on both the IoT device and the verbal action command.

Additionally, a Natural-Language Processor (NLP) may be provided outputting the verbal action command to the logic circuitry.

Additionally, a Wide-Area-Network (WAN) transceiver may be provided for receiving transmissions over the talkgroup and outputting the talkgroup identification to the logic circuitry.

Finally, a database may be provided comprising the mapping of the talkgroup to the IoT device address.

Figure 6:
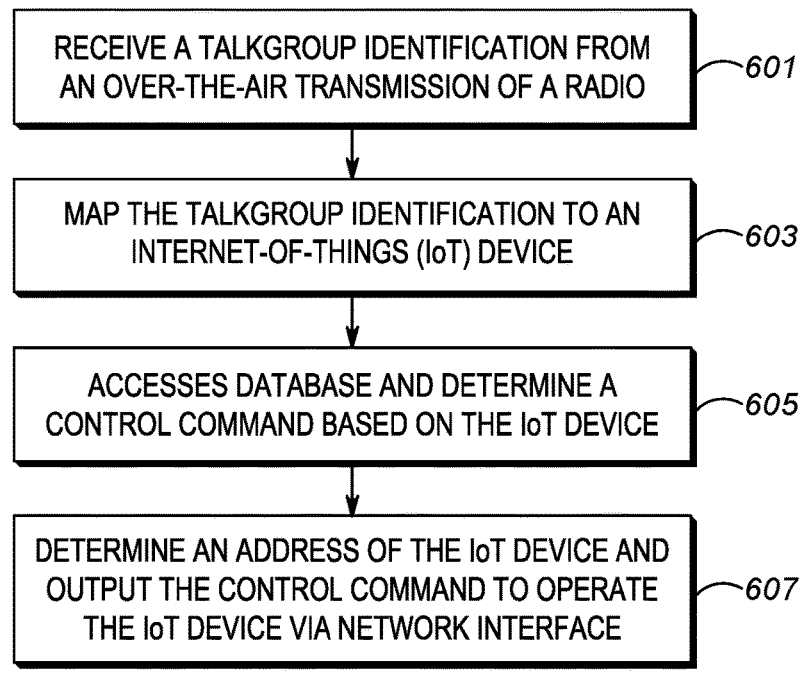
FIG. 6 is a flow chart showing operation of the PTT to IoT server of FIG. 5.

FIG. 6 is a flow chart showing operation of the PTT-to-IoT server of FIG. 5. The logic flow begins at step 601 where logic circuitry 503 receives a talkgroup identification from an over-the-air transmission of a radio. At step 603, logic circuitry 503 maps the talkgroup identification to an Internet-of-Things (IoT) device. The mapping is preferably done by accessing database 504 and retrieving the mappings as shown in Table 1 and Table 2. At step 605, logic circuitry 503 accesses database 504 and determines a control command based on the IoT device. Logic circuitry 503 also determines an address of the IoT device and outputs the control command to operate the IoT device via network interface 505 (step 607).

As discussed above, a verbal action command may be received from the over-the-air transmission; and the step of determining the control command further comprises determining the control command based on both the IoT device and the verbal action command.

Finally, the talkgroup identification preferably is received from a push-to-talk transmission from the radio.

Figure 7:
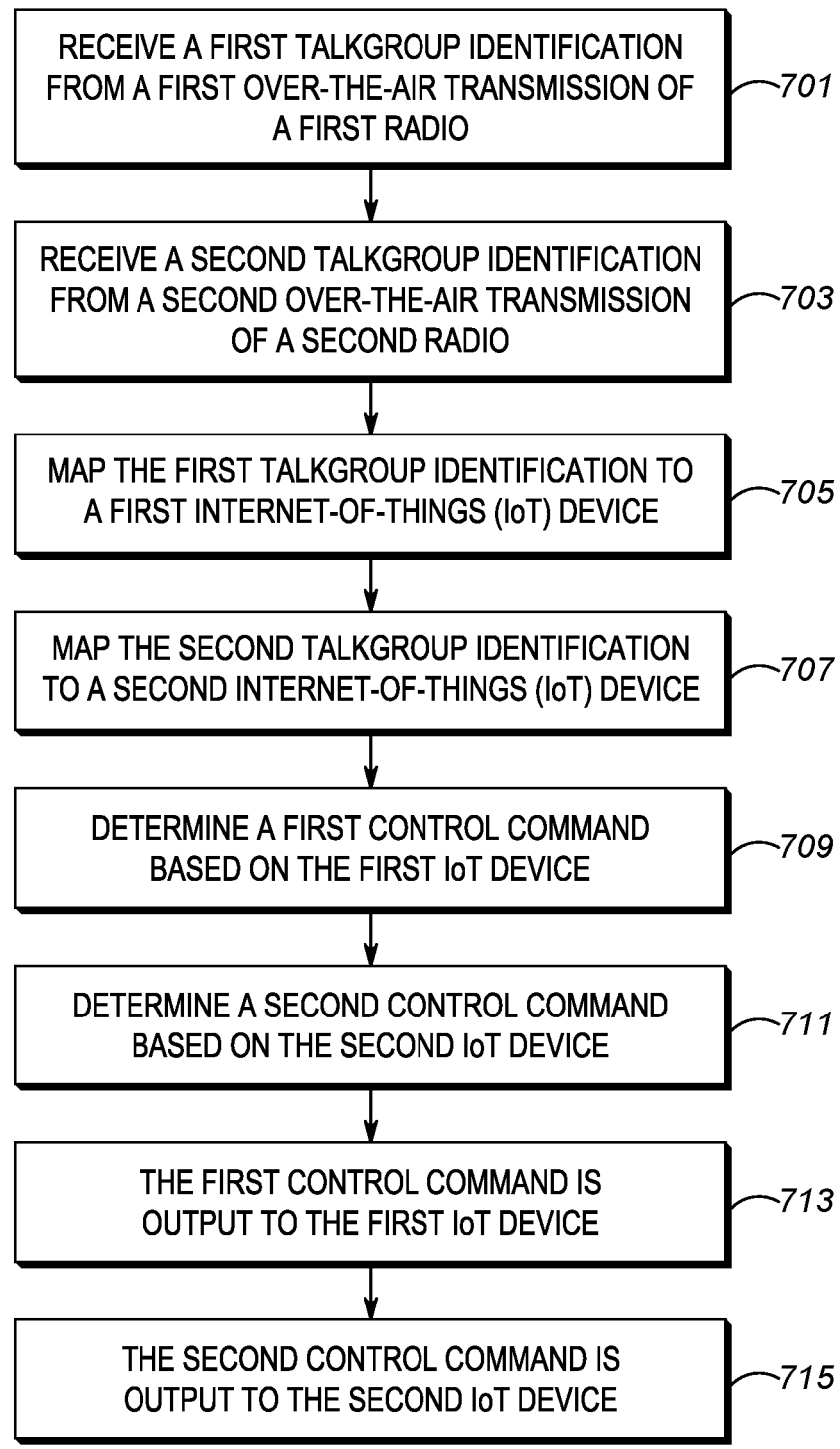
FIG. 7 is a flow chart showing operation of the PTT to IoT server of FIG. 5.

As discussed above, each IoT device may be mapped to a specific talkgroup, so that reception on a first talkgroup initiates an action to a first IoT device, and reception on a second talkgroup initiates an action on a second IoT device. This is illustrated in the logic flow of FIG. 7.

The logic flow begins at step 701 where logic circuitry 503 receives a first talkgroup identification from a first over-the-air transmission of a first radio. At step 703, logic circuitry 503 receives a second talkgroup identification from a second over-the-air transmission of a second radio. Logic circuitry 503 then maps the first talkgroup identification to a first Internet-of-Things (IoT) device (step 705) and maps the second talkgroup identification to a second IoT device (step 707). Logic circuitry then determines a first control command based on the first IoT device (step 709) and determines a second control command based on the second IoT device (step 711). The first control command is output to the first IoT device (step 713) and the second control command is output to the second IoT device (step 715).

As discussed above, the first control command may comprise a control command from a first control protocol, and the second control command may comprise a control command from a second control protocol, differing from the first control protocol, with the first IoT device differing from the second IoT device.

Logic circuitry 503 may also receive a first verbal action command from the first over-the-air transmission of the first radio and a second verbal action command from the second over-the-air transmission of the second radio. When this occurs, the step of determining the first control command further comprises determining the first control command based on both the first IoT device and the first verbal action command, and the step of determining the second control command further comprises determining the second control command based on both the second IoT device and the second verbal action command.

Figure 8:
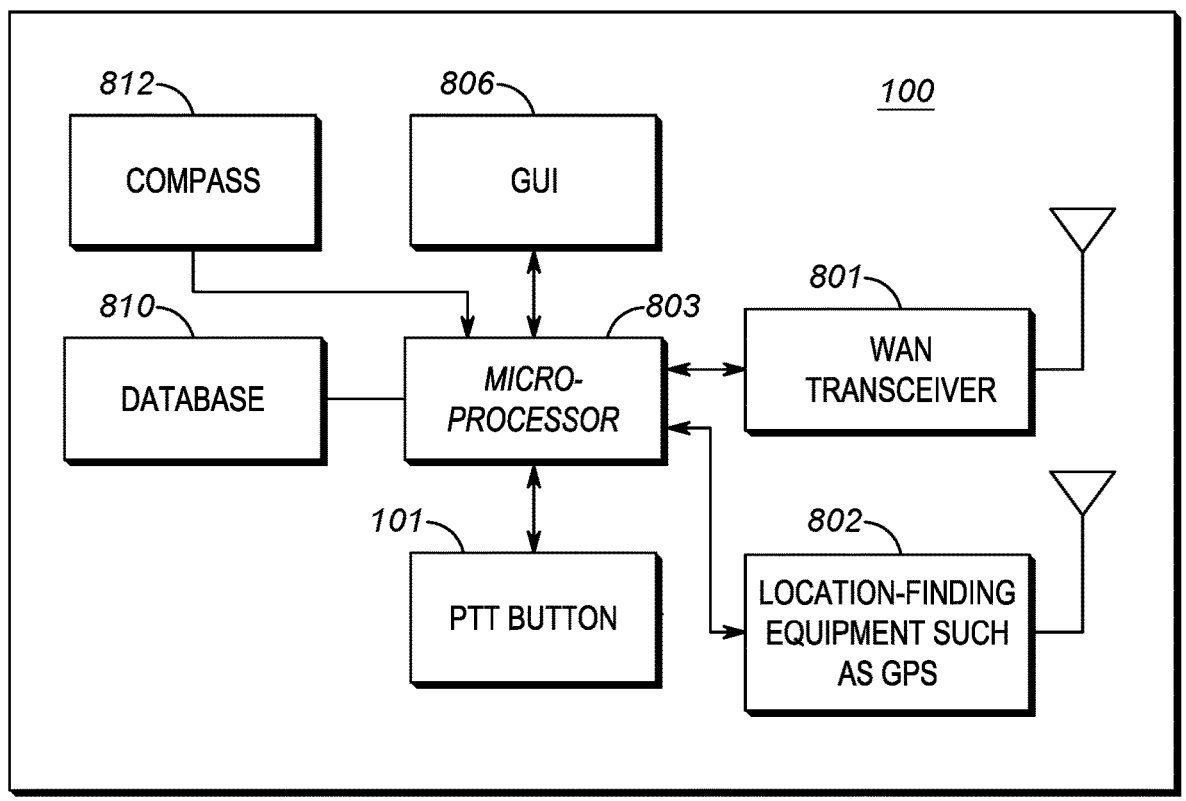
FIG. 8 is a block diagram of the radio of FIG. 1.

FIG. 8 is a block diagram of radio 100. As shown, radio 100 includes a wide-area-network (WAN) transceiver 801, GPS receiver 802 (serving as location-finding equipment), Graphical User Interface (GUI) 806, database 810, logic circuitry 803, and PTT button 101. In other implementations, radio 100 may include more, fewer, or different components.

WAN transceiver 801 may comprise well known long-range transceivers that utilize any number of network system protocols. (As one of ordinary skill in the art will recognize, a transceiver comprises both a transmitter and a receiver for transmitting and receiving data). For example, WAN transceiver 801 may be configured to utilize a next-generation cellular communications protocol operated by a cellular service provider, or any public-safety protocol such as an APCO 25 network or the FirstNet broadband network. WAN transceiver 801 may also be used to provide the necessary information to any cloud service providing virtual-partner functionality.

GPS receiver 802 comprises well circuitry for determining a current location via the global positioning system array of satellites.

GUI 806 provides a way of displaying information and receiving an input from a user. For example, GUI 806 may provide a way of conveying (e.g., displaying) a contact list to a user. In this particular embodiment GUI 806 comprises a touch screen interface.

Logic circuitry 803 comprises a digital signal processor (DSP), general purpose microprocessor, a programmable logic device, or application specific integrated circuit (ASIC) and is configured to modify a contact list (address book) to include various sections having IoT devices.

Database 110 is provided. Database 810 comprises standard memory (such as RAM, ROM, . . . , etc) and serves to store IoT devices, recently accessed IoT devices, IoT device rankings, and IoT device locations, and a user's contact list, including user-identified "favorite" IoT devices.

PTT button 101 may be a well known circuitry initiate a PTT call to an IoT device by the pressing of a physical button.

As discussed above, because there may be thousands of IoT devices that are accessible by the above technique, an IoT device contact section of a user address book will be created for devices accessing IoT devices. IoT devices will appear in the various sections of a user's contact list. For example, recently-accessed IoT devices may appear in the "recently called" section of the user's contacts, favorite IoT devices may appear in a "favorites" section of the user's contacts, and/or nearby IoT devices may appear in a "nearby IoT devices" section of the user's contacts.

In addition to the above sections of the user's contacts, a "relevant IoT devices" section may be included in the user's contacts as well. IoT devices will appear in this section when they are ranked above a predetermined threshold. For example, a relevancy ranking may comprise things that are relevant to a current work tasks, etc. For example, a relevancy ranking may comprise things that are relevant to a current work tasks, etc. For example, a field technician fixing a remote pump will cause the pump to have high relevancy. Also a relevancy ranking may comprise things in alarms state that are relevant to the user and associated with an action that can stop the alarm. For example a car may have high relevancy when the fuel level is low.

Figure 9:
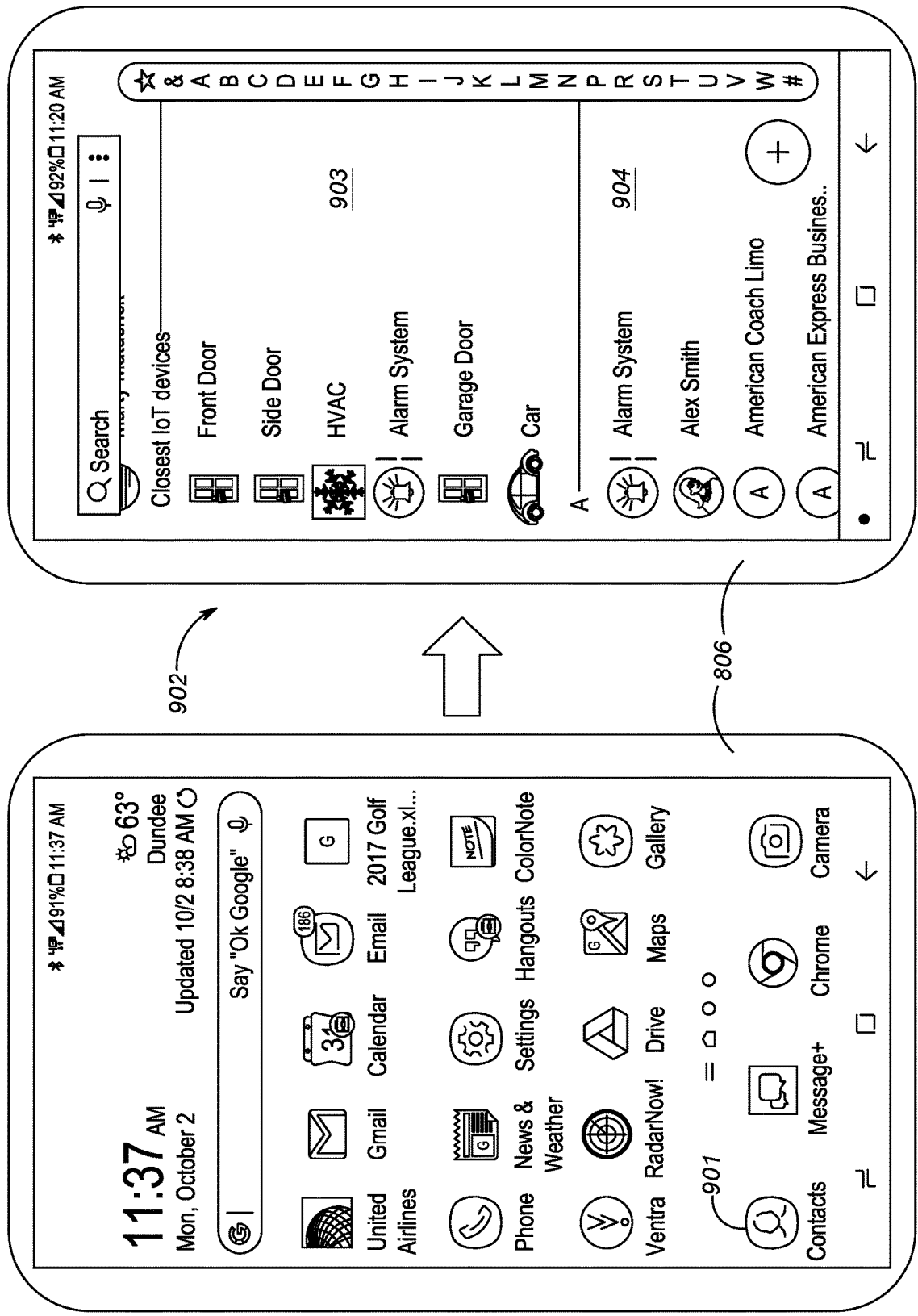
FIG. 9 illustrates a modified contacts list.

As shown in FIG. 9, touch screen 806 (GUI) has user interface (UI) elements displayed. (Only UI element 901 is labeled in FIG. 9). One of ordinary skill in the art will recognize that UI elements can take an infinite number of shapes and sizes. UI elements may all be a similar shape and size, or may be different shapes and sizes. UI elements represent places where the user may interact with touch screen 806, the interaction of which executes a particular function, application, or program. UI elements may sometimes be referred to as controls or widgets. These controls or widgets may take any form to execute any function. For example, UI element 901 opens up a "contacts" section whenever the user taps on UI element 901. More particularly, during operation touch screen 806 will detect a user's current finger position. Contacting upon UI element 902 will cause touch screen 806 to display the user's contacts.

As shown in FIG. 9, the user's contacts 902. Some contacts are organized in alphabetical order (section 904). However, various additional sections may be included in the user's contacts 902. In FIG. 9, a "closest IoT devices" section 902 is included within the contact list. The "closest IoT devices" section is created by logic circuitry 803 retrieving a current location of radio 100. Database 810 is accessed to determine a location of stored IoT devices, and then logic circuitry 803 determines nearby IoT devices. The nearby IoT devices are then ordered by logic circuitry 803 from closest to farthest, and the closest N IoT devices are inserted into the user's contacts (In this example, N=6). The user's contacts can then be displayed on GUI 806 when accessed by the user. As described above, highlighting a IoT device and pressing PTT button 101 will activate the IoT device as described above. It should be noted that other techniques may be utilized to access the IoT devices shown in the contacts list 902.

As discussed above, in addition to (or in lieu of) "Closest IoT devices" section 903, a "relevant IoT devices" section may be inserted into the user's contact list (not shown in FIG. 9). As discussed above, the "relevant" IoT devices listed in this section may be based on proximity (as described above), or when an IoT device is ranked above a predetermined threshold. For example, a relevancy ranking may comprise things that are relevant to a current work tasks, etc. For example, a triggered alarm (e.g., car low on fuel) may be identified as "relevant".

Finally, it should be noted that the section 904 of contacts list 902 that includes an alphabetically-ordered list of user contacts may include IoT devices as well, existing in alphabetical order based on a given name. So, for example, "Alarm System" is listed in "Closest IoT devices" section 903 and in the alphabetized section 904 (along with other, non-IoT contacts).

Figure 10:
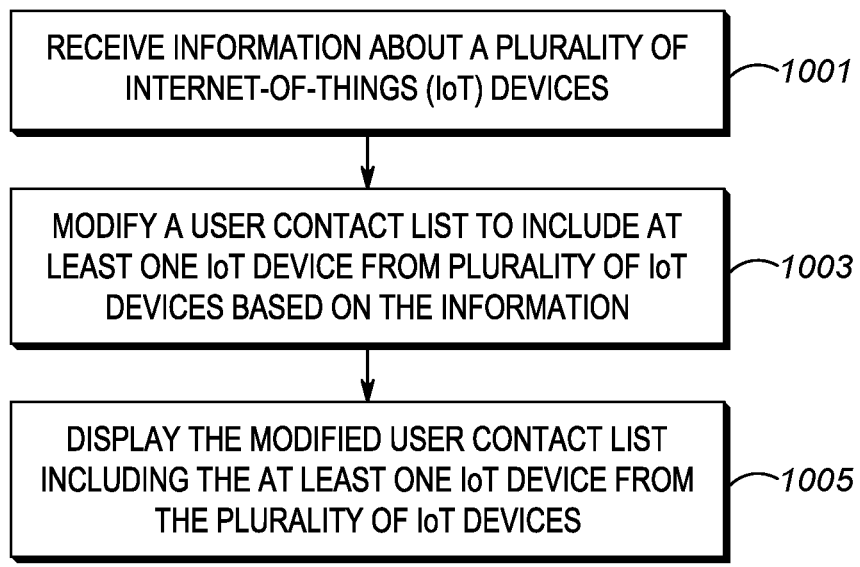
FIG. 10 is a flow chart showing operation of the radio of FIG. 8.

FIG. 10 is a flow chart showing operation of the radio of FIG. 8. The logic flow begins at step 1001 where logic circuitry 803 receives information about a plurality of Internet-of-Things (IoT) devices. At step 1003 logic circuitry modifies a user contact list to include at least one IoT device from plurality of IoT devices based on the information. Finally, logic circuitry 803 outputs the contact list to GUI 806 displaying the modified user contact list including the at least one IoT device from the plurality of IoT devices (step 1005).

As discussed above, the information about the plurality of IoT devices may comprise a location of the plurality of IoT devices, with the GUI displaying a "nearby IoT devices" section. Additionally, the information about the plurality of IoT devices may comprise a relevancy of the plurality of IoT devices, wherein an IoT device is relevant if it is associated with a metric above a predetermined threshold, and the GUI displaying a modified user contact list having a "relevant IoT devices" section.

As discussed above, the user contact list may be stored in database 810, and retrieved, modified, and re-stored by logic circuitry 803.

The above logic flow provides for an apparatus 100 comprising logic circuitry 803 receiving information about a plurality of Internet-of-Things (IoT) devices and modifying a user contact list to include at least one IoT device from plurality of IoT devices based on the information. A graphical user interface (GUI) 806 is provided for displaying the modified user contact list including the at least one IoT device from the plurality of IoT devices.

It should be noted that the "information" about the plurality of IoT devices is preferably stored in database 810 and can be dynamic. Preferably, the information may be updated by a user through GUI 806, or automatically updated via information obtained through WAN transceiver.

The information about the plurality of IoT devices may comprise a location of the plurality of IoT devices, with the GUI displaying modified user contact list having a "nearby IoT devices" section. Additionally, the information about the plurality of IoT devices may comprise a relevancy of the plurality of IoT devices, wherein an IoT device is relevant if it is associated with a metric above a predetermined threshold. For example, if an alarm state is set to "1", the alarm becomes relevant and if it is set to "0", the alarm is not relevant. In this case, the GUI displays the modified user contact list having a "relevant IoT devices" section.

The metric may also comprise a relevancy to a current task so that, for example, when a user is at work (determined, for example, by a time of day) certain IoT devices become relevant.

When the "information" about the plurality of IoT devices comprises a location, apparatus 100 comprises location-finding equipment determining a current location of a portable device, logic circuitry determining a location of a plurality of Internet-of-Things (IoT) devices and modifying a user contact list to include IoT devices based on the current location of the portable device and the location of the IoT devices. Finally, a graphical user interface (GUI) is provided for displaying the modified user contact list.

Database 810 may be provided for storing IoT devices and their location. logic circuitry may determine the location of the plurality of IoT devices by accessing the database.

Whether or not a list of talkgroups are shown (as in FIG. 2), or a list of contacts shown (as in FIG. 9), a user may find it difficult to identify a particular IoT device within their talkgroup/contacts list. In particular, a large number of potential IoT devices surrounding an individual may make it very difficult to identify any particular IoT device from a contacts list of a talkgroup list. For example, when user approaches a room with four doors and seven lights a talkgroup or contacts list may show Door 1, Door 4, Door 3, Door 2, light switch 1, . . . light switch 7. As is evident, it will be confusing as to which door and light each talkgroup/contact controls. For example, "does the door 3 talkgroup control the door on my left or on my right?" Even if more-specific identifiers are used, (e.g., MasterBed Door TG, Front Door TG, Light 54th Floor TG), during critical situations (e.g. with smoke, pursuit, running etc.), a responder that is not familiar with the incident area may still get confused.

In order to address this issue, device 100 will utilize location and orientation data to dynamically name and/or re-name IoT device talkgroup names based on device location, device orientation, and IoT location. The process of dynamically naming IoT device talkgroup names may take place at either IoT server 301 or device 100. In other words, device 100 may provide its location and orientation to server 301, and server 301 may name and rename the talkgroup names that associated with the IoT devices accordingly based on the relative orientation between IoT devices and the device 100 and provide this information to device 100. Alternatively, server 301 may provide location data for IoT devices to device 100, and device 100 may dynamically name and rename IoT device talkgroup names accordingly based on the relative orientation between IoT devices and the device 100. It should be noted that contact names may be renamed as described above as well.

Expanding on the above, device 100 will be equipped with an electronic compass 812 in order to determine its orientation. Since a user will typically operate device 100 in front of the user, with the screen of device 100 facing the user's face, it will be possible to deduce the direction a user is facing by determining device orientation. Specifically, a line from the bottom of device 100 through the top of device 100, parallel to any display, is a very good approximation of the direction a user of device 100 is facing. Alternatively, the device can deduce the user orientation relative to the device 100 based on the device operating mode, for example, if the user is using the radio said performing push to talk (PTT) then the user is facing the microphone of device 100; if the user is performing touch gesture on the touch display, in unlock state, detect face or eyes then the user is facing the touch screen of device 100; if the radio is in holster that is worn at the waist of the user (detect by holster sensor, optical sensor, hall sensor), then the device 100 is in orthogonal relative position with user (at the side of the waist of user).

The location of the IoT device, location of radio 100, and the heading (orientation) of radio 100 are used to rename talkgroups or contacts for IoT devices. More particularly, talkgroups and/or contacts are appended with information regarding the direction the IoT device is from the user. In other words, the server or device 100 will append and/or rename the talkgroup/contact with information on the direction from the user to the IoT device. The renamed contact/talkgroup will describe the relative location of the IoT device to the user, for example, "Door on Your Right", "Door in Front of You", "Light over Your head", "Light 3 feet behind you", "Light Switch in front on your left", . . . , etc. This is illustrated in FIG. 11.

Figure 11:
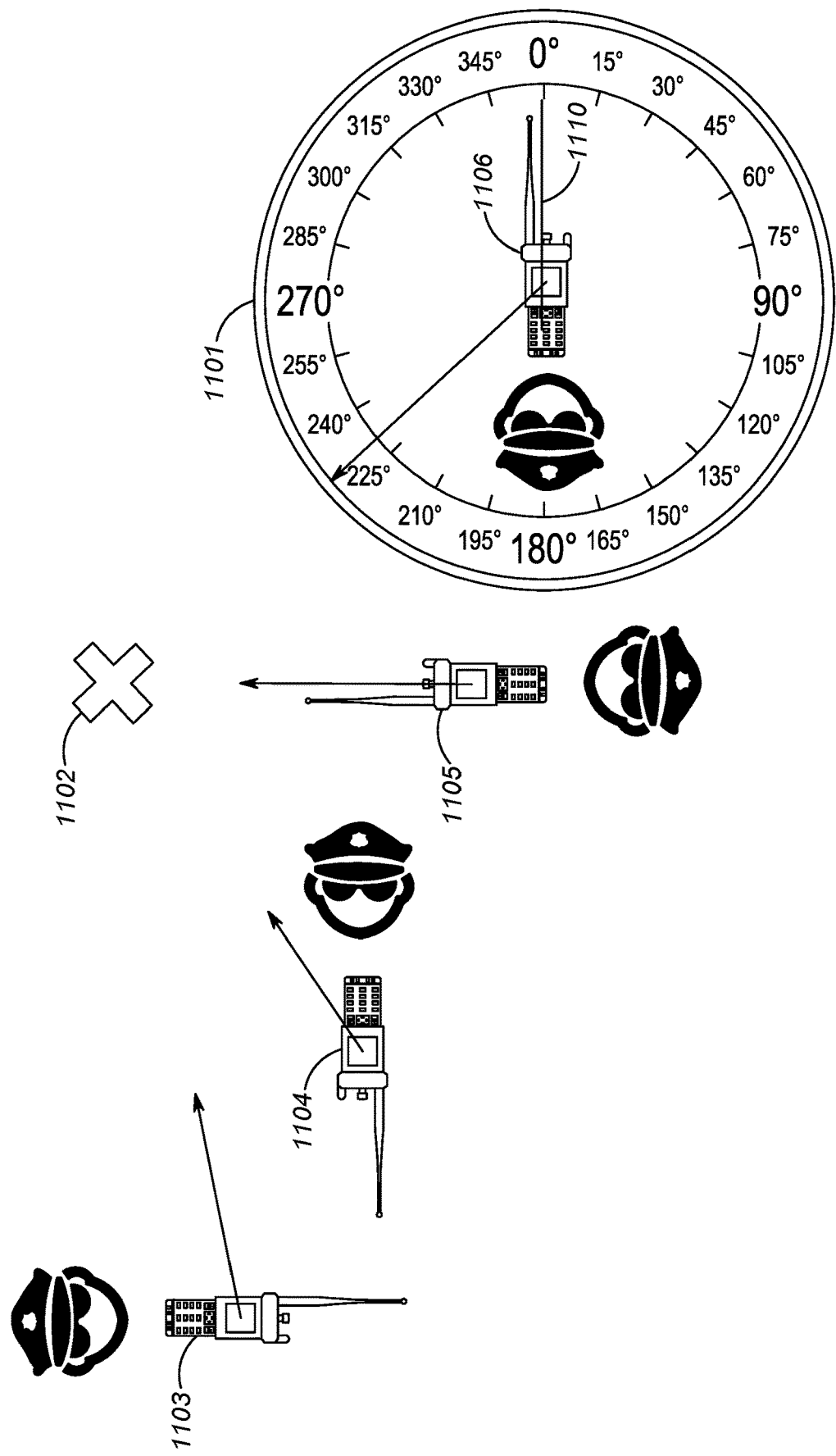
FIG. 11 illustrates renaming talkgroups or contacts.
Figure 12:
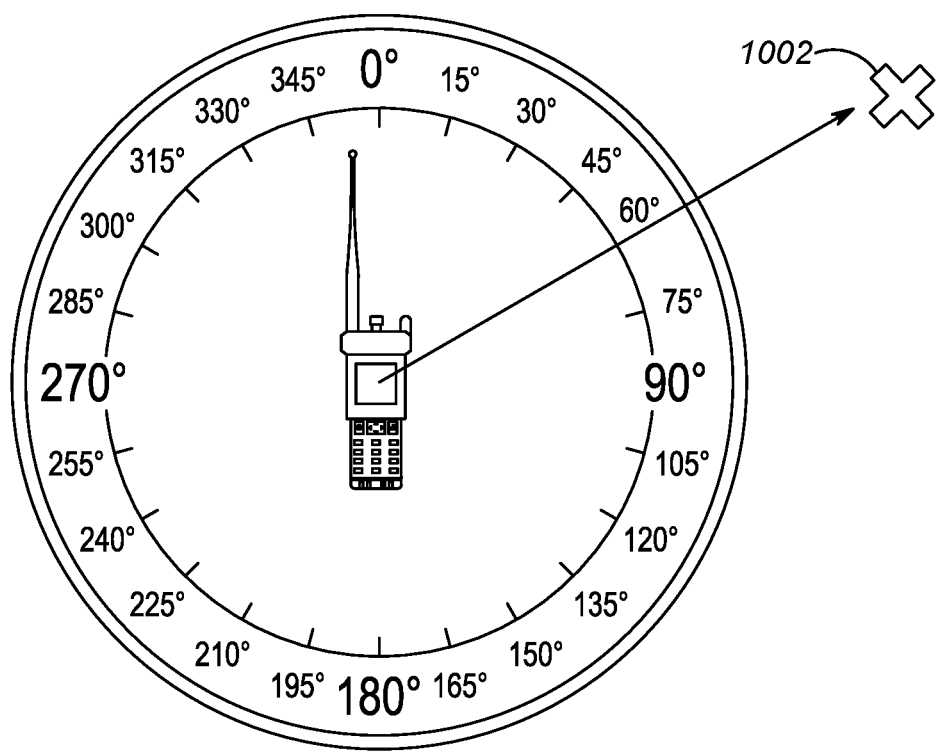
FIG. 12 illustrates renaming talkgroups or contacts.

As shown in FIG. 11, for radios 1103-1106 are shown having different locations and orientations to IoT device 1102. Each device will have a direction to IoT device 1102 that is measured in degrees from an imaginary line 1110 existing through the device, from its front to its back, and parallel to a display (only one imaginary line is labelled in FIG. 11). Compass 1101 helps illustrate this. So, for example, IoT device 1102 is oriented approximately 220 degrees from radio 1106, IoT device 1102 is oriented approximately 0 degrees from radio 1105, IoT device 1102 is oriented approximately 150 degrees from radio 1104, and IoT device 1102 is oriented approximately 255 degrees from radio 1103. FIG. 12 illustrates the above in more detail, with IoT device 1102 orientated 60 degrees from a radio. Location information and orientation information are used to rename, or append information to talkgroups or contacts as illustrated in the table below.

TABLE 2

Renaming of talkgroups or Contacts.

| Heading to IoT device | Append the following to IoT Talkgroup or Contact |
|---|---|
| 316-45 degrees | In front of you |
| 46-135 degrees | On your right |
| 136-225 degrees | Behind you |
| 226-315 degrees | On your left |

It should be noted that other information may be appended to the talkgroup and/or contact name. For example, a distance to the IoT device may be appended to the name of the talkgroup/contact. In addition, while the above description was given with regards to 2-dimensional space, the present invention may be extended to 3-dimensional space, capturing IoT devices above and below a user. Also, direction information as it appears on a clock (e.g., 2 o'clock, 11 o'clock) may be appended to talkgroup/contact names.

Figure 13:
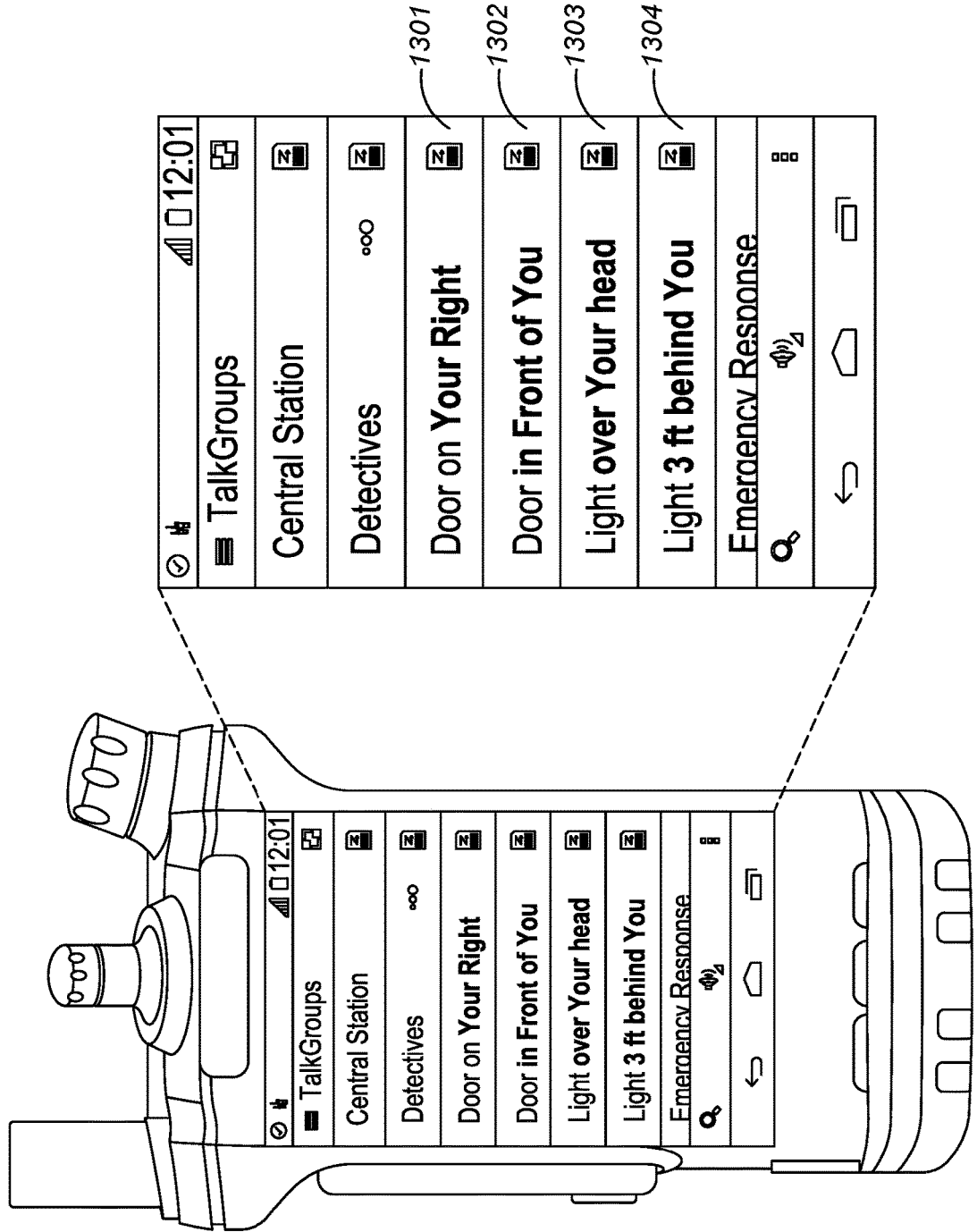
FIG. 13 illustrates renaming talkgroups or contacts.

FIG. 13 illustrates the renaming of talkgroups as described above. As shown, talkgroup 1301 was originally named "Door" and renamed to "Door on Your Right" by appending "on Your Right" to the name. Talkgroup 1302 was originally named "Door" and renamed to "Door in Front of You" by appending "in Front of You" to the name. Talkgroup 1303 was originally named "Light" and renamed to "Light over Your head" by appending "over Your head" to the name. Talkgroup 1304 was originally named "Light" and renamed to "Light 3 ft behind You" by appending "3 ft behind You" to the name.

When server 301 is naming and renaming talkgroups and contacts as described above, Server 301 comprises logic circuitry 503 receiving a location of a device, a location of a radio, and a heading from the radio to the device. In one of the embodiment, the operation status of the device 100 (e.g. unlocked state, in holster, PTT) also is received by the logic circuitry to determine the relative device 100 orientation with the user. The location of the radio and the heading is received via WAN transceiver, sent by radio 100. The talkgroup name, and its location is preferably stored in database 504. Logic circuitry 503 modifies a name of a talkgroup/contact based on the location of the device, the location of the radio, and the heading from the radio to the device. In one embodiment, the name of a talkgroup/contact is changed additionally based on device operation status. The updated talkgroup/contact name is transmitted to radio 100 via WAN transceiver 501.

As mentioned above, the device comprises an Internet of Things (IoT) device, and the logic circuitry may modify the name by adding a descriptor to the original name, for example, by appending a direction after an original name of the talkgroup/contact.

It should be noted that the above technique may be dynamic, with IoT devices being renamed frequently as radio 100 moves. With this in mind, logic circuitry 503 may determine that radio 100 has moved, or its orientation has changed by receiving such information via WAN transceiver 501. Logic circuitry 503 may again modify the name of the talkgroup/contact based on a new location of the radio.

When radio 100 is naming and renaming talkgroups/contacts as described above, radio 100 comprises location-finding equipment 802 determining a location of a radio and compass 812 determining an orientation of the radio. Logic circuitry 803 receives a location of a device via WAN transceiver 801, the location of a radio, and the orientation of the radio, and determines a heading from the radio to the device. Logic circuitry 803 modifies a name of a talkgroup/contact based on the location of the device, the location of the radio, and the heading from the radio to the device. The talkgroups/contacts names are then stored in database 810. Graphical user interface (GUI) 806 is provided for displaying the modified name.

As discussed above, the device preferably comprises an Internet of Things (IoT) device. Additionally, logic circuitry 803 modifies the name by adding a descriptor to the original name. This may be accomplished by appending a direction after an original name of the talkgroup/contact.

Logic circuitry 803 may determine that the radio has moved by receiving an updated location and orientation, and again modify the name of the talkgroup/contact based on a new location of the radio.

Figure 14:
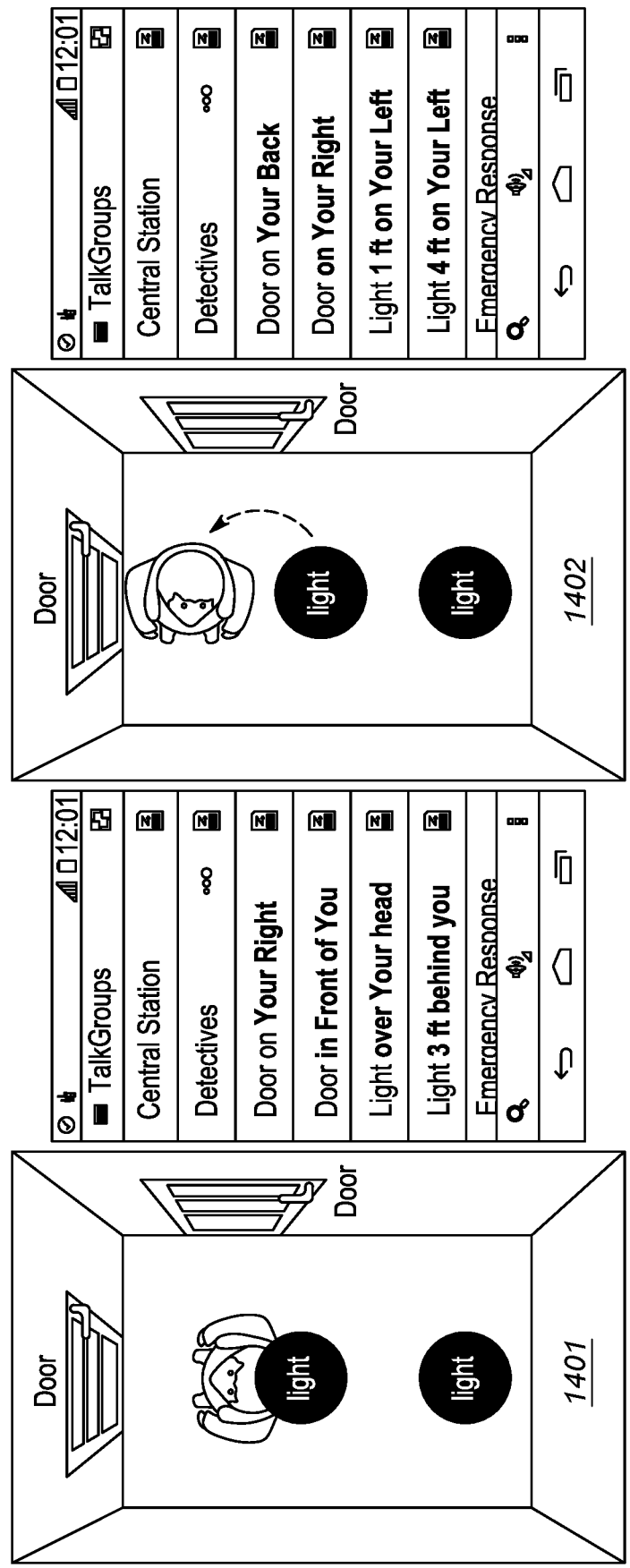
FIG. 14 illustrates renaming talkgroups or contacts.

FIG. 14 illustrates a user changing orientations and positions. As illustrated, the user at 1401 has two IoT lights and two IoT doors in the room. The talkgroup names of the IoTs are changed based on the relative orientation and distance of the user to the IOTs. As the user moves and turns to their left as shown in 1402, the names of the talkgroups are changed dynamically. Thus, the talkgroup named "door on your right" is renamed "door at your back", the talkgroup named "door in front of you" is renamed "door on your right", . . . , etc.

Figure 15:
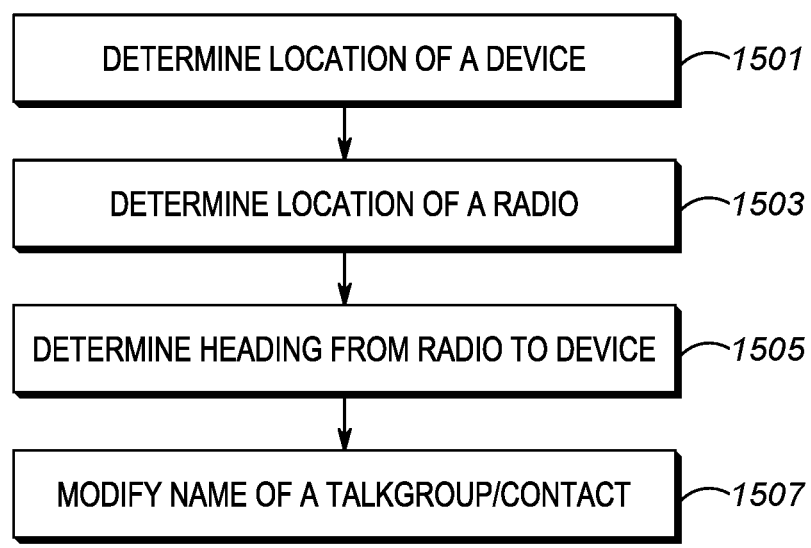
FIG. 15 is a flow chart showing operation of a device or server renaming talkgroups or contacts.

FIG. 15 is a flow chart showing operation of a server or radio when renaming talkgroups/contacts as described above. The logic flow begins at step 1501 where logic circuitry 503/803 determines a location of a device, such as an IoT device. When radio 100 is determining a location of an IoT device, logic circuitry 803 may retrieve this information from database 810 or may receive the information from server 301 via WAN transceiver 801. When server 301 is determining the location of the IoT device, this information preferably is retrieved from database 504.

At step 1503 logic circuitry 503/803 determines a location of a radio; As discussed above, when radio 100 is renaming contacts and/or talkgroups, logic circuitry 803 may receive the location from location-finding equipment, such as a GPS receiver. When server 301 is renaming contacts and/or talkgroups, logic circuitry 503 will receive a location of the radio via WAN transceiver 501 (transmitted from radio 100).

At step 1505, logic circuitry 503/803 determines a heading from the radio to the device. This information is determined from compass 812, and may be provided to server 301 via WAN transceiver 801.

At step 1507 logic circuitry 503/803 modifies a name of a talkgroup/contact based on the heading from the radio to the device as described above.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

Those skilled in the art will further recognize that references to specific implementation embodiments such as "circuitry" may equally be accomplished via either on general purpose computing apparatus (e.g., CPU) or specialized processing apparatus (e.g., DSP) executing software instructions stored in non-transitory computer-readable memory. It will also be understood that the terms and expressions used herein have the ordinary technical meaning as is accorded to such terms and expressions by persons skilled in the technical field as set forth above except where different specific meanings have otherwise been set forth herein.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. An apparatus comprising:
   logic circuitry receiving a location of a device, a location of a radio, and a heading from the radio to the device, the logic circuitry modifying a name of a talkgroup based on the location of the device, the location of the radio, and a heading from the radio to the device; and
   a wide-area network (WAN) transceiver, transmitting the modified name.

2. The apparatus of claim 1 wherein the device comprises an Internet of Things (IoT) device.

3. The apparatus of claim 1 wherein the logic circuitry modifies the name by adding a descriptor to an original name.

4. The apparatus of claim 1 wherein the logic circuitry determines that the radio has moved, and again modifies the name of the talkgroup based on a new location of the radio.

5. The apparatus of claim 1 wherein the logic circuitry modifies the name by appending a direction after an original name of the talkgroup.

6. An apparatus comprising:
   location-finding equipment determining a location of a radio;
   a compass determining an orientation of the radio;
   logic circuitry receiving a location of a device, the location of a radio, and the orientation of the radio, and determining a heading from the radio to the device, the logic circuitry modifying a name of a talkgroup based on the heading from the radio to the device; and
   a graphical user interface (GUI) displaying the modified name.

7. The apparatus of claim 6 wherein the device comprises an Internet of Things (IoT) device.

8. The apparatus of claim 6 wherein the logic circuitry modifies the name by adding a descriptor to an original name.

9. The apparatus of claim 6 wherein the logic circuitry determines that the radio has moved, and again modifies the name of the talkgroup based on a new heading from the radio to the device.

10. The apparatus of claim 6 wherein the logic circuitry modifies the name by appending a direction after an original name of the talkgroup.

11. A method comprising the steps of:
    determining a location of a device;
    determining a location of a radio;
    determining a heading from the radio to the device;
    modifying a name of a talkgroup based on the heading from the radio to the device; and
    displaying the modified name.

12. The method of claim 11 wherein the device comprises an Internet of Things (IoT) device.

13. The method of claim 11 wherein the name is modified by adding a descriptor to an original name.

* * * * *